United States Patent
Karasawa et al.

(10) Patent No.: US 12,319,209 B2
(45) Date of Patent: Jun. 3, 2025

(54) INFORMATION PROCESSING DEVICE, INFORMATION PROCESSING METHOD, AND STORAGE MEDIUM

(71) Applicants: TOYOTA JIDOSHA KABUSHIKI KAISHA, Toyota (JP); DENSO CORPORATION, Kariya (JP)

(72) Inventors: Tomoaki Karasawa, Matsudo (JP); Junichiro Tamao, Tokyo (JP); Takahiro Utsunomiya, Tokyo (JP); Takumi Horie, Chofu (JP); Toshiaki Isogai, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 18/527,760

(22) Filed: Dec. 4, 2023

(65) Prior Publication Data

US 2024/0198932 A1    Jun. 20, 2024

(30) Foreign Application Priority Data

Dec. 15, 2022    (JP) ................. 2022-200354

(51) Int. Cl.
*B60R 16/023*    (2006.01)
*B60R 21/013*    (2006.01)

(52) U.S. Cl.
CPC ........ *B60R 16/0231* (2013.01); *B60R 21/013* (2013.01)

(58) Field of Classification Search
CPC .............. B60R 16/0231; B60R 21/013; B60R 16/0232; G06F 9/544; G06F 9/546
See application file for complete search history.

(56) References Cited

U.S. PATENT DOCUMENTS

| | | | |
|---|---|---|---|
| 2008/0294598 A1 | 11/2008 | Mai | |
| 2016/0320984 A1* | 11/2016 | Tamura | ................... G06F 9/546 |
| 2022/0103650 A1 | 3/2022 | Tanaka et al. | |
| 2023/0229330 A1 | 7/2023 | Miwa et al. | |

FOREIGN PATENT DOCUMENTS

| | | |
|---|---|---|
| JP | 2008-293081 A | 12/2008 |
| JP | 2022-057226 A | 4/2022 |
| JP | 2023-103850 A | 7/2023 |

* cited by examiner

*Primary Examiner* — Jacob M Amick
*Assistant Examiner* — Charles J Brauch
(74) *Attorney, Agent, or Firm* — Oblon, McClelland, Maier & Neustadt, L.L.P.

(57) ABSTRACT

An information processing device is employed in a vehicle control system and controls access to a shared storage. The information processing device includes a memory and a processor. The processor creates multiple threads. The processor stores, in the memory, access requests for access to the shared storage by applications and adds the access requests for access to a queue such that the access requests are lined up before proceeding with processes in the applications. The processor executes the access requests lined up in the queue using free threads in the order in which the access requests were added to the queue.

13 Claims, 5 Drawing Sheets

INFORMATION PROCESSING DEVICE, INFORMATION PROCESSING METHOD, AND STORAGE MEDIUM

BACKGROUND

1. Field

The present disclosure relates to an information processing device, an information processing method, and a storage medium for controlling access to a shared storage in a vehicle control system.

2. Description of Related Art

Japanese Laid-Open Patent Publication No. 2022-057226 discloses a vehicle control system. The vehicle control system includes multiple electronic control units connected to each other via a network. Each electronic control unit executes applications. The vehicle control system includes a shared storage accessed by the applications. The vehicle control system includes an information processing device that controls access to the shared storage by the applications.

While one application is accessing the shared storage and using a file, another application may request access to the shared storage. In such a case, the application that requested access later cannot use the files stored in the shared storage. As a result, the application may not be executed immediately, leading to processing delays.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, an information processing device is configured to be employed in a vehicle control system. The vehicle control system includes multiple electronic control units connected to each other via a network and a shared storage accessed by multiple applications executed by the respective electronic control units. The information processing device is configured to control access to the shared storage. The information processing device includes a memory and a processor. The processor is configured to create multiple threads, store, in the memory, access requests for access to the shared storage by the applications and add the access requests for access to a queue such that the access requests are lined up before proceeding with processes in the applications, and execute the access requests lined up in the queue using free ones of the threads in the order in which the access requests were added to the queue.

The above-described configuration allows files to be accessed through each of the threads. The information processing device thus suppresses the occurrence of processing delays.

In a second general aspect, an information processing method by which an information processing device configured to be employed in a vehicle control system controls access to a shared storage is provided. The vehicle control system includes multiple electronic control units connected to each other via a network and the shared storage accessed by multiple applications executed by the respective electronic control units. The information processing method includes a first step of creating multiple threads by a processor of the information processing device, a second step of storing, by the processor and in a memory, access requests for access to the shared storage by the applications and adding the access requests for access to a queue such that the access requests are lined up before proceeding with processes in the applications, and a third step of executing, by the processor, the access requests lined up in the queue using free ones of the threads, created through the first step, in the order in which the access requests were added to the queue.

The above information processing method allows the information processing device to access the files through each of the threads. The information processing method thus suppresses the occurrence of processing delays.

In a third general aspect, a non-transitory computer-readable storage medium stores an information processing program that includes instructions to be executed by a processor of an information processing device configured to be employed in a vehicle control system. The vehicle control system includes multiple electronic control units connected to each other via a network, and a shared storage accessed by multiple applications executed by the respective electronic control units. The instructions cause the processor to create multiple threads, store, in a memory, access requests for access to the shared storage by the applications and add the access requests for access to a queue such that the access requests are lined up before proceeding with processes in the applications, and execute the access requests lined up in the queue using free ones of the threads in the order in which the access requests were added to the queue.

The non-transitory computer-readable storage medium that stores instructions of the information processing program allows the information processing device to access the files through each of the threads. The instruction of the information processing program thus suppresses the occurrence of processing delays.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

Figure 1:
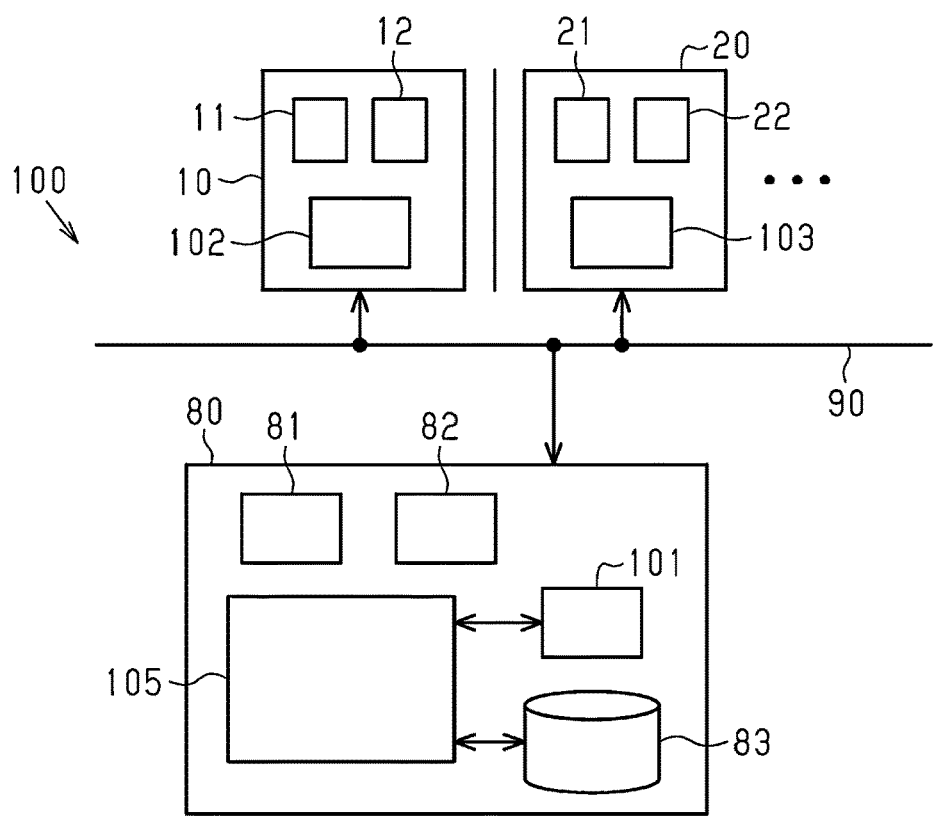
FIG. 1 is a schematic diagram illustrating a configuration of a vehicle control system.

An information processing device according to a first embodiment will now be described with reference to FIGS. 1 to 6. FIG. 1 schematically illustrates a configuration of a vehicle control system 100 mounted on a vehicle such as an automobile.

Configuration of Vehicle Control System 100

As shown in FIG. 1, the vehicle control system 100 includes electronic control units (EUCs) connected to each other via a network 90. Hereinafter, electronic control units will be referred to as ECUs. The network 90 is, for example, a controller area network (CAN) (registered trademark) or an Ethernet (registered trademark).

FIG. 1 illustrates ECUs, which include a first ECU 10, a second ECU 20, and a central ECU 80. Each ECU includes a processor and one or more memories. The memories may include a memory that stores a program including instructions to be executed by the processor and a memory that temporarily stores data.

As shown in FIG. 1, the first ECU 10 includes a processor 11 and a memory 12. The second ECU 20 includes a processor 21 and a memory 22. The central ECU 80 includes a processor 81 and a memory 82. The memory 82 serves as a non-transitory computer-readable storage medium and stores an information processing program including instructions to be executed by the processor 81.

The central ECU 80 is, for example, an ECU for a central gateway. The central ECU 80 has a function as a hub in the vehicle control system 100. Among multiple ECUs, the ECUs other than the central ECU 80 are ECUs that implement various functions. For example, one of the multiple ECUs is an engine ECU, which controls the engine. One of the multiple the ECUs is a brake ECU, which controls the brakes. One of the multiple ECUs is a multimedia ECU, which controls a car navigation system and an audio system. One of the multiple ECUs is a driver assist ECU, which implements advanced driver assistance. One of the multiple ECUs is a dashboard camera ECU, which controls a dashboard camera. One of the multiple ECUs is an airbag ECU, which detects a collision and activates an airbag. One of the multiple ECUs is an emergency notification ECU, which performs an emergency notification when the airbag is activated. One of the multiple ECUs is a car alarm ECU, which detects unauthorized intrusion and activates an alarm device.

The multiple ECUs are each equipped with an application to perform their respective functions. As shown in FIG. 1, the central ECU 80 is equipped with a first application 101. The first ECU 10 is equipped with a second application 102. The second ECU 20 is equipped with a third application 103.

The central ECU 80 also includes a shared storage 83. The shared storage 83 is a shared storage accessed by applications installed in multiple ECUs. The shared storage 83 stores files of various types of data indicating the state of the vehicle. Each application obtains information on the vehicle from the shared storage 83 and stores new information in the shared storage 83.

The central ECU 80 is an information processing device that controls access to the shared storage 83 by the applications. The central ECU 80 includes a storage coordinator 105 that has a function for controlling access to the shared storage 83 by each application. The storage coordinator 105 is a virtual machine configured within the central ECU 80. That is, the functions of the storage coordinator 105 are performed by the processor 81 in the central ECU 80 and the information processing program executing instructions stored in the memory 82.

Figure 2:
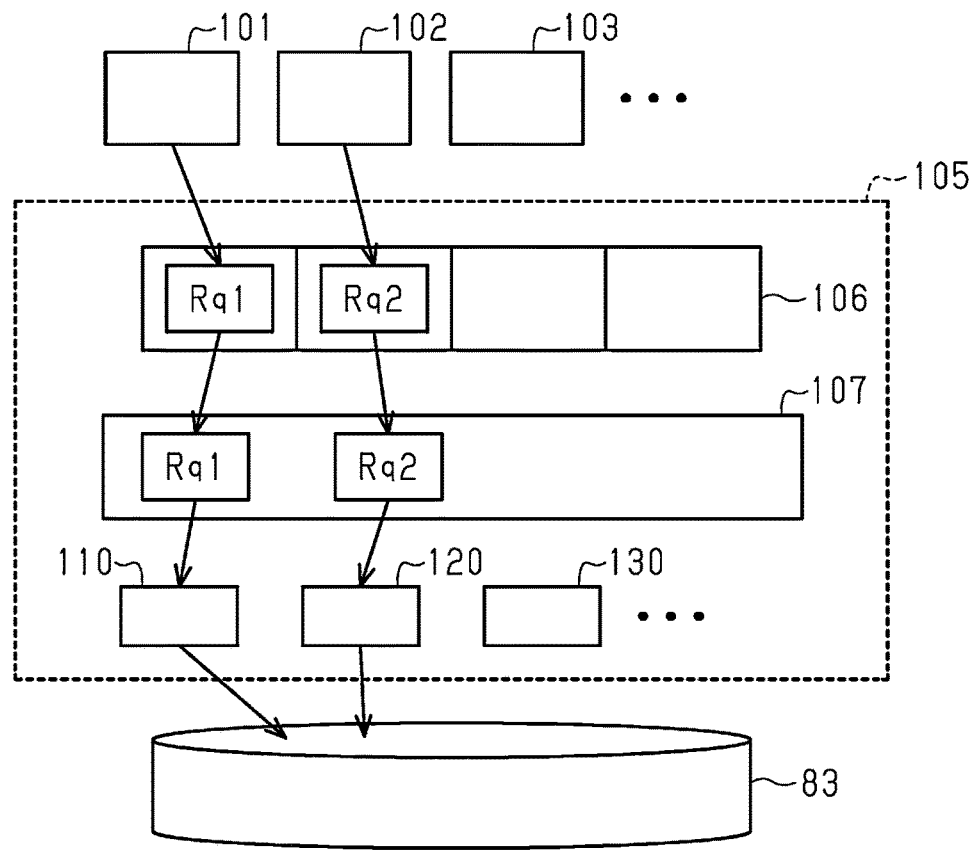
FIG. 2 is a schematic diagram illustrating functions of a storage coordinator of a central ECU.

As shown in FIG. 2, the storage coordinator 105 accesses the shared storage 83 based on an access requests from each application. The storage coordinator 105 then reads information from files stored in the shared storage 83 and provides the read information to the application that made the access request.

The storage coordinator 105 has the functions of a queue 106 and a thread accessor 107. A queue is a data structure that arranges elements in the order they are added, and operates under the rule of extracting elements in the same order they were added, meaning the element added first is extracted first. Access requests from each application are executed using multiple threads created by the storage coordinator 105. FIG. 2 illustrates a first thread 110, a second thread 120, and a third thread 130.

In FIG. 2, an access request from the first application 101 is denoted by Rq1. Further, an access request from the second application 102 is denoted as Rq2. The access requests from the respective applications are added to the queue 106 in the order of occurrence of the access requests. The access requests added to the queue 106 are extracted by the thread accessor 107 in the order in which they were added to the queue 106. The function of the queue 106 is implemented by the processor 81 storing the access requests in the memory 82.

The thread accessor 107 extracts access requests from the queue 106, and accesses the shared storage 83 by using free threads.

Next, the flow of processes related to the access to the shared storage 83 will be described. The following process is implemented by a processor executing a program stored in the memory of each ECU.

Creation of Threads

Figure 3:
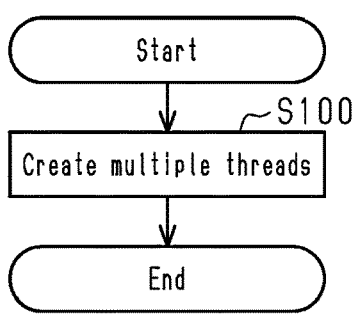
FIG. 3 is a flowchart illustrating the flow of processes executed by the storage coordinator.

FIG. 3 is a flowchart showing the flow of processes in a routine for creating threads. This routine is executed by the storage coordinator 105 when the vehicle control system 100 is activated.

When this routine is started, the storage coordinator 105 creates multiple threads in the process of step S100. Specifically, in the process of step S100, the processor 81 creates the same number of threads as the number of applications that access the shared storage 83. The creation of a thread involves securing resources in the central ECU 80 necessary to execute access to the shared storage 83 in response to an access request.

After creating multiple threads, the storage coordinator 105 temporarily suspends this routine.

Progress of Processes in Application

Figure 4:
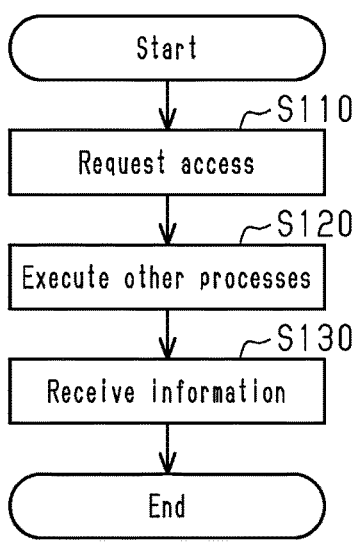
FIG. 4 is a flowchart illustrating the flow of processes executed by an application.

FIG. 4 is a flowchart showing the flow of processes in a routine executed by an application that requires access to the shared storage 83.

When this routine is started, the application first requests access to the shared storage 83 by sending an access request to the storage coordinator 105 in step S110. As described above, the access requests sent to the storage coordinator 105 are added to the queue 106. The storage coordinator 105 transmits information indicating that the access request has been received and added to the queue 106 to the application, and advances the process of the application to step S120. In the process of step S120, the application executes another process other than the process of requesting access to the shared storage 83.

In the process of step S130, the application receives the information read from the shared storage 83. As a result, the process requiring the read information is also executed, and a series of routines by the application is completed.

Execution of Access by Thread Accessor 107

Figure 5:
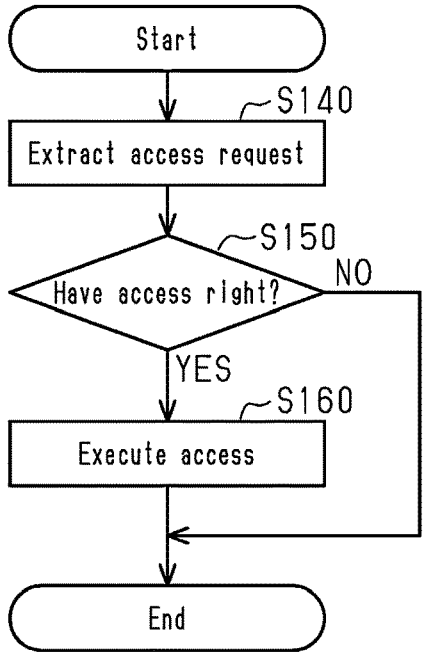
FIG. 5 is a flowchart illustrating the flow of processes executed by a thread accessor.

FIG. 5 is a flowchart showing the flow of processes in a routine executed by the thread accessor 107. This routine is repeatedly executed by the thread accessor 107 when an access request is stored in the queue 106.

When starting this routine, the thread accessor 107 extracts an access request from the queue 106 in the process of step S140. Specifically, the processor 81 extracts the oldest access request stored in the queue 106. Next, in the process of step S150, the thread accessor 107 determines whether the application that made the access request extracted from the queue 106 has the right to access the files stored in shared storage 83. Specifically, the processor 81 checks the information of the application that made the access request stored in the memory 82 and determines whether the application that made the access request has the right to access the files.

In the process of step S150, when determining that the application has the right to access (step S150: YES), the thread accessor 107 advances the process to step S160. Then, in the process of step S160, the thread accessor 107 accesses the shared storage 83. Specifically, the processor 81 accesses the shared storage 83 using a free thread among the multiple threads. Then, the thread accessor 107 reads the requested information from a file of the shared storage 83 and transmits the information to the application that made the access request. When executing the access to the shared storage 83 in this way, the thread accessor 107 temporarily suspends this routine.

In the process of step S150, when determining that the application that made the access request does not have the right to access (step S150: NO), the thread accessor 107 temporarily suspends this routine without executing the process of step S160. That is, if the application that made the access request does not have the right to access, the thread accessor 107 terminates this routine without executing access to the shared storage 83.

Operation

Figure 6:
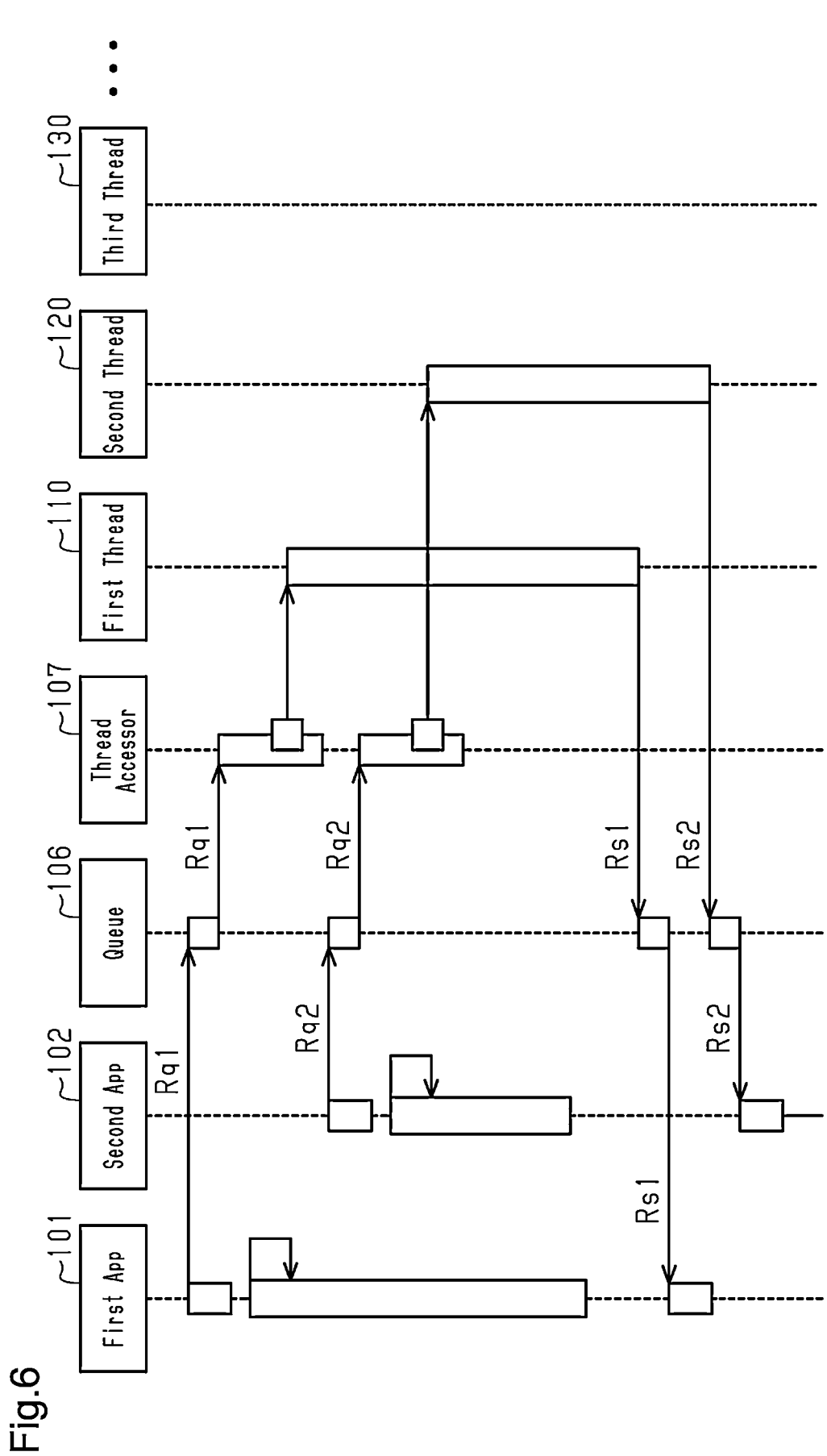
FIG. 6 is a sequence chart illustrating an example of access to a shared storage.

Next, operation of the information processing device according to the first embodiment will be described with reference to FIG. 6. A case will be described in which access requests for access to the shared storage 83 are made by the first application 101 and the second application 102. In FIG. 6, the first application 101 is referred to as First App. In FIG. 6, the second application 102 is referred to as Second App.

As described above, when the vehicle control system 100 is activated, the central ECU 80 creates the same number of threads as the number of applications that access the shared storage 83 (step S100 in FIG. 3). FIG. 6 illustrates the first thread 110, the second thread 120, and the third thread 130 among the created threads.

As shown in FIG. 6, when the first application 101 requests access to the shared storage 83 (step S110 in FIG. 4), the central ECU 80 stores the access request Rq1 in the memory 82. As a result, the access request Rq1 is added to the queue 106.

The thread accessor 107 of the central ECU 80 extracts the access request Rq1 from the queue 106 (step S140 in FIG. 5). At this time, the storage coordinator 105 transmits, to the first application 101, information indicating that the access request Rq1 has been added to the queue 106. The first application 101 that has received this information executes processes other than the access request for access to the shared storage 83 (step S120 in FIG. 4).

The thread accessor 107, which has extracted the access request Rq1 from the queue 106, determines whether the first application 101 has the right to access the shared storage 83 (step S150 in FIG. 5). The thread accessor 107, which has determined that the first application 101 has the right to access, executes access to the shared storage 83 using the first thread 110, which is free (step S160 in FIG. 5).

As shown in FIG. 6, in this example, while access to the shared storage 83 using the first thread 110 is being executed, access to the shared storage 83 is also requested by the second application 102.

As shown in FIG. 6, when the second application 102 requests access to the shared storage 83 (step S110 in FIG. 4), the central ECU 80 stores the access request Rq2 in the memory 82. As a result, the access request Rq2 is added to the queue 106.

The thread accessor 107 of the central ECU 80 extracts the access request Rq2 from the queue 106 (step S140 in FIG. 5). At this time, the storage coordinator 105 transmits, to the second application 102, information indicating that the access request Rq2 has been added to the queue 106. The second application 102 that has received this information executes processes other than the access request for access to the shared storage 83 (step S120 in FIG. 4).

The thread accessor 107, which has extracted the access request Rq2 from the queue 106, determines whether the second application 102 has the right to access the shared storage 83 (step S150 in FIG. 5). The thread accessor 107, which has determined that the second application 102 has the right to access, executes access to the shared storage 83 using the second thread 120, which is free (step S160 in FIG. 5).

As shown in FIG. 6, when reading the information corresponding to the first access request Rq1 from the shared storage 83 using the first thread 110, the storage coordinator 105 adds a reading response Rs1 to the queue 106. The reading response Rs1 is information indicating that reading of information corresponding to the first access request Rq1 has been completed.

The first application 101 extracts the reading response Rs1 from the queue 106 and receives the information read from the shared storage 83 (step S130 in FIG. 4). The first application 101 uses the information thus received to proceed with processing.

Also, when reading the information corresponding to the second access request Rq2 from the shared storage 83 using the second thread 120, the storage coordinator 105 adds a reading response Rs2 to the queue 106. The reading response Rs2 is information indicating that reading of information corresponding to the second access request Rq2 has been completed.

The second application 102 extracts the reading response Rs2 from the queue 106 and receives the information read from the shared storage 83 (step S130 in FIG. 4). The second application 102 uses the information thus received to proceed with processing.

In this manner, the central ECU 80 uses multiple threads to concurrently process access requests from multiple applications. Also, in the vehicle control system 100, access to the shared storage 83 and other processes in applications are executed concurrently.

Advantages (1-1) The storage coordinator 105 can access files through respective threads. The central ECU 80 thus suppresses the occurrence of processing delays.

(1-2) The processor 81 of the central ECU 80 creates the same number of threads as the number of applications that access the shared storage 83. Therefore, each application can secure one thread. As a result, the central ECU 80 allows multiple applications to access the shared storage 83 simultaneously.

(1-3) In the central ECU 80, the processor 81 creates multiple threads when the vehicle control system 100 is activated. The central ECU 80 suppresses the occurrence of processing delays by eliminating the need to wait for completion of thread creation.

(1-4) The above-described information processing method, which controls access to the shared storage 83, includes a first step (step S100 in FIG. 3), in which the processor 81 creates multiple threads. In addition, the above-described information processing method includes a second step, in which the processor 81 stores, in the memory 82, access requests for access to the shared storage 83 made by an application and adds the access requests for access to the queue 106 such that the access requests are lined up before proceeding with processes in the application. Further, the above-described information processing method includes a third step, in which the processor 81 executes the access requests lined up in the queue 106 using free ones of the threads, created through the first step, in the order in which the access requests were added to the queue 106.

This information processing method allows the central ECU 80 to access files through respective threads. The information processing method thus suppresses the occurrence of processing delays.

(1-5) The information processing program executed by the processor 81 is stored in the memory 82 of the central ECU 80. The information processing program causes the processor 81 to create multiple threads. The information processing program stores, in the memory 82, access requests for access to the shared storage 83 made by applications, and adds the access requests for access to a queue 106 such that the access requests are lined up before proceeding with processes in the applications. In addition, the information processing program executes access requests lined up in the queue 106 using free threads in the order in which the access requests were added to the queue 106.

This program allows the central ECU 80 to access files through respective threads. The information processing program thus suppresses the occurrence of processing delays.

Second Embodiment

A second embodiment will now be described. Differences from the first embodiment will mainly be discussed. In the first embodiment, the processor 81 of the central ECU 80 creates the same number of threads as the number of applications that access the shared storage 83. In contrast, in the second embodiment, the processor 81 of the central ECU 80 creates the same number of threads as the number of files accessed by applications.

Operation

According to such a configuration, one thread for accessing a file is created for each file.

Advantages

The second embodiment has the following advantage in addition to the above described advantage (1-1).

(2-1) The central ECU 80 allows for simultaneous access to multiple files.

Third Embodiment

A third embodiment will now be described. Differences from the first embodiment will mainly be discussed. In the first embodiment, the central ECU 80 creates multiple threads when the vehicle control system 100 is activated. In contrast, in the third embodiment, the processor 81 of the central ECU 80 creates a thread each time an application makes an access request for access to the shared storage 83.

Specifically, the storage coordinator 105 in the central ECU 80 of the third embodiment does not execute the routine described with reference to FIG. 3. The storage coordinator 105 of the third embodiment executes a routine shown in FIG. 7 instead of the routine described with reference to FIG. 5.

Execution of Access by Thread Accessor 107

Figure 7:
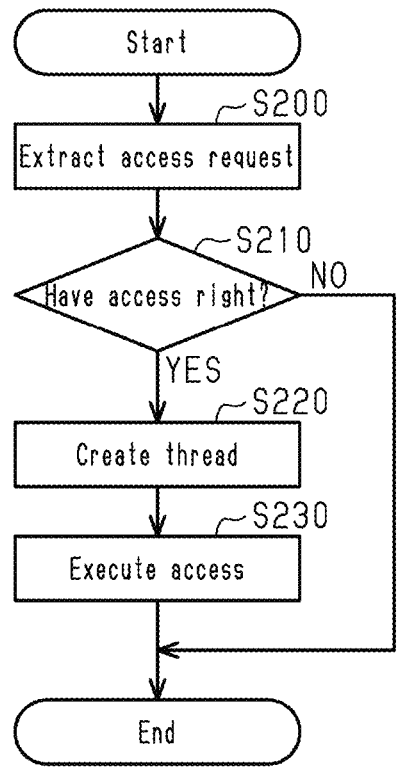
FIG. 7 is a flowchart illustrating the flow of processes executed by a thread accessor in an information processing device according to a third embodiment.

FIG. 7 is a flowchart showing the flow of processes in a routine executed by the thread accessor 107 in the third embodiment. This routine is repeatedly executed by the thread accessor 107 when an access request is stored in the queue 106.

When starting this routine, the thread accessor 107 extracts an access request in the process of step S200. Specifically, the processor 81 extracts the oldest access request stored in the queue 106. Next, in the process of step S210, the thread accessor 107 determines whether the request source of the access request retrieved from the queue 106 has the right to access the files stored in shared storage 83. Specifically, the processor 81 checks the information of the application that made the access request stored in the memory 82 and determines whether the application that made the access request has the right to access the files.

In the process of step S210, when determining that the application has the right to access (step S210: YES), the thread accessor 107 advances the process to step S220. Then, in step S220, the thread accessor 107 creates one thread for accessing the shared storage 83 in response to an access request. Then, in the process of step S230, the thread accessor 107 accesses the shared storage 83. Specifically, the thread accessor 107 accesses the shared storage 83 using the thread created by the processor 81 through the process of step S220. Then, the thread accessor 107 reads the requested information from a file of the shared storage 83 and transmits the information to the application that made the access request. When executing the access to the shared storage 83 in this way, the thread accessor 107 temporarily suspends this routine.

In the process of step S210, when determining that the application that made the access request does not have the right to access (step S210: NO), the thread accessor 107 temporarily suspends this routine without executing the processes of step S220 and S230. That is, if the application that made the access request does not have the right to access, the thread accessor 107 terminates this routine without executing access to the shared storage 83.

Operation

The central ECU 80 of the third embodiment creates a thread when an access request is made.

Advantages

The third embodiment has the following advantage in addition to the above described advantage (1-1).

(3-1) The central ECU 80 according to the third embodiment prevents creating more threads than necessary as compared with a case in which extra threads are created in advance as in the first embodiment.

Fourth Embodiment

A fourth embodiment will now be described. Differences from the first embodiment will mainly be discussed. In the first embodiment, the central ECU 80 creates multiple threads when the vehicle control system 100 is activated. In contrast, in the fourth embodiment, the processor 81 of the central ECU 80 creates only one thread when the vehicle control system 100 is activated. Then, the processor 81 creates a new thread in response to an access request as in the third embodiment on condition that a specific execution condition indicating an emergency is met.

Specifically, the storage coordinator 105 in the central ECU 80 of the fourth embodiment executes the routine shown in FIG. 8, instead of the routine described with reference to FIG. 3.

Creation of Threads

Figure 8:
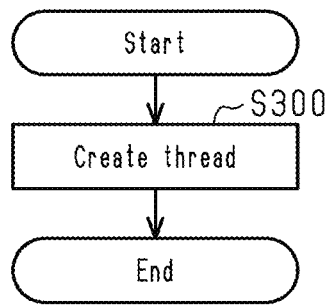
FIG. 8 is a flowchart illustrating the flow of processes executed by a storage coordinator in an information processing device according to a fourth embodiment.

FIG. 8 is a flowchart showing the flow of processes in a routine for creating threads in the central ECU 80 according to the fourth embodiment. This routine is executed by the storage coordinator 105 when the vehicle control system 100 is activated.

When this routine is started, the storage coordinator 105 creates one thread in the process of step S300. After creating the thread, the storage coordinator 105 temporarily suspends this routine.

Execution of Access by Thread Accessor 107

Figure 9:
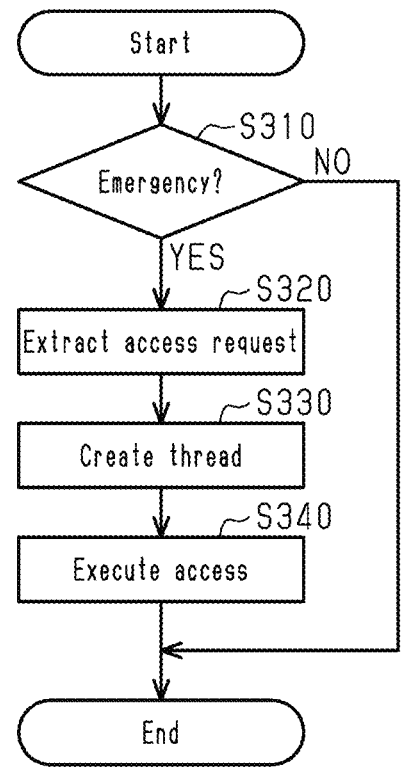
FIG. 9 is a flowchart illustrating the flow of processes executed by a thread accessor in an information processing device according to the fourth embodiment.

FIG. 9 is a flowchart showing the flow of processes in a routine executed by the thread accessor 107 in the fourth embodiment. This routine is repeatedly executed by the thread accessor 107 when an access request is stored in the queue 106.

When this routine is started, the thread accessor 107 determines whether the situation is an emergency in the process of step S310. Specifically, in the process of step S310, the processor 81 determines that the situation is an emergency if a specific execution condition indicating that the situation is an emergency is met. The specific execution condition includes, for example, the following conditions.

Condition that a collision has been detected
Condition that the alarm device is operating When at least one of the above conditions is met, the processor 81 determines that the execution condition is met, and determines that the situation is an emergency in the process of step S310. Detection of a collision is performed by the airbag ECU. The alarm device is operated by the car alarm ECU.

In the process of step S310, when determining that the situation is an emergency (step S310: YES), the thread accessor 107 advances the process to step S320. Then, the thread accessor 107 extracts an access request in the process of step S320. Specifically, the processor 81 extracts the oldest access request stored in the queue 106. Then, in step S330, the thread accessor 107 creates one thread for accessing the shared storage 83 in response to the access request. Then, in the process of step S340, the thread accessor 107 accesses the shared storage 83. Specifically, the thread accessor 107 accesses the shared storage 83 using the thread created by the processor 81 through the process of step S330. Then, the thread accessor 107 reads the requested information from a file of the shared storage 83 and transmits the information to the application that made the access request. When executing the access to the shared storage 83 in this way, the thread accessor 107 temporarily suspends this routine.

In the process of step S310, if it is determined that the situation is not an emergency (step S310: NO), the thread accessor 107 does not execute the processes of step S320, step S330, and step S340. Then, the thread accessor 107 temporarily suspends the routine shown in FIG. 9. In this case, the thread accessor 107 sequentially accesses the shared storage 83 in response to the access requests stored in the queue 106 by using one thread created through the process of step S300.

Operation

In the fourth embodiment, the processor 81 creates multiple threads on condition that the execution conditions including a condition that a collision has been detected are met. Also, the processor 81 creates multiple threads on condition that the execution condition including a condition that the alarm device is operating is met.

Advantages

The fourth embodiment has the following advantage in addition to the above described advantage (1-1).

(4-1) The central ECU 80 according to the fourth embodiment can secure resources required for executing the processes required in an emergency. For example, the central ECU 80 can appropriately execute an application for controlling a dashboard camera and an application for performing an emergency notification.

Fifth Embodiment

A fifth embodiment will now be described. Differences from the fourth embodiment will mainly be discussed. In the fourth embodiment, the processor 81 of the central ECU 80 creates a new thread in response to an access request on condition that a specific execution condition indicating that the situation is an emergency is met. In contrast, in the fifth embodiment, the processor 81 of the central ECU 80 creates a new thread in response to an access request on condition that a voltage Vb of a battery, which is the power source of the vehicle, is greater than or equal to a threshold.

Specifically, the storage coordinator 105 in the central ECU 80 of the fifth embodiment executes the routine shown in FIG. 10, instead of the routine described with reference to FIG. 9.

Execution of Access by Thread Accessor 107

Figure 10:
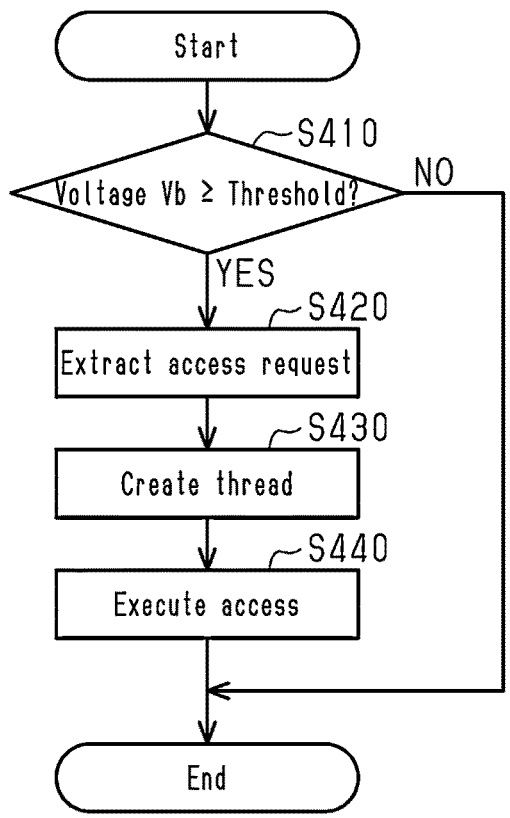
FIG. 10 is a flowchart illustrating the flow of processes executed by a thread accessor in an information processing device according to a fifth embodiment.

FIG. 10 is a flowchart showing the flow of processes in a routine executed by the thread accessor 107 in the fifth embodiment. This routine is repeatedly executed by the thread accessor 107 when an access request is stored in the queue 106.

When starting this routine, the thread accessor 107 determines whether the voltage Vb of the battery is greater than or equal to the threshold in the process of step S410. Specifically, in the process of step S410, the processor 81 determines whether the voltage Vb of the battery mounted in the vehicle is greater than or equal to the threshold.

The threshold is set to such a level that the voltage Vb is ensured to such an extent that the control of the vehicle does not become unstable even when multiple threads are created and multiple accesses to the shared storage 83 are simultaneously executed based on the fact that the voltage Vb is greater than or equal to the threshold.

In the process of step S410, when determining that the voltage Vb is greater than or equal to the threshold (step S410: YES), the thread accessor 107 advances the process to step S420. Then, the thread accessor 107 extracts an access request in the process of step S420. Specifically, the processor 81 extracts the oldest access request stored in the queue 106. Then, in step S430, the thread accessor 107 creates one thread for accessing the shared storage 83 in response to the access request. Then, in the process of step S440, the thread accessor 107 accesses the shared storage 83. Specifically, the thread accessor 107 accesses the shared storage 83 using the thread created by the processor 81 through the process of step S430. Then, the thread accessor 107 reads the requested information from a file of the shared storage 83 and transmits the information to the application that made the access request. When executing the access to the shared storage 83 in this way, the thread accessor 107 temporarily suspends this routine.

When determining in the process of step S410 that the voltage Vb is less than the threshold (step S410: NO), the thread accessor 107 does not execute the processes of step S420, step S430, and step S440. Then, the thread accessor 107 temporarily suspends the routine shown in FIG. 10. In this case, the thread accessor 107 sequentially accesses the shared storage 83 in response to the access requests stored in the queue 106 by using one thread created through the process of step S300.

Operation

In the fifth embodiment, the processor 81 creates multiple threads on condition that the execution conditions including a condition that the voltage Vb of the battery is greater than or equal to the threshold are met.

Advantages

The fifth embodiment has the following advantage in addition to the above described advantage (1-1).

(5-1) Executing access to the shared storage 83 concurrently through multiple threads results in increased power consumption. The power supply may become unstable if multiple threads are created and accesses to the shared storage 83 are executed concurrently when the voltage Vb is relatively low. The central ECU 80 of the fifth embodiment does not create multiple threads when the voltage Vb is low. This prevents the power supply from becoming unstable. In addition, the central ECU 80 can prioritize the use of electricity to drive the vehicle.

Sixth Embodiment

A sixth embodiment will now be described. In the fifth embodiment, the processor 81 of the central ECU 80 creates a new thread in response to an access request on condition that the voltage Vb of the battery is greater than or equal to the threshold. In contrast, the central ECU 80 of the sixth embodiment creates multiple threads on condition that the voltage Vb of the battery is greater than or equal to the threshold when the vehicle control system 100 is activated.

Specifically, the storage coordinator 105 in the central ECU 80 of the sixth embodiment executes the routine shown in FIG. 11, instead of the routine described with reference to FIG. 3.

Creation of Threads

Figure 11:
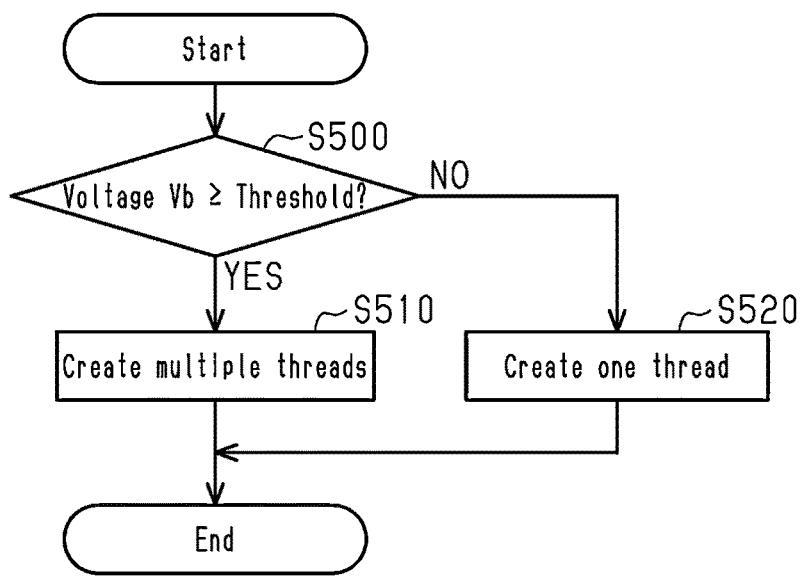
FIG. 11 is a flowchart illustrating the flow of processes executed by a storage coordinator in an information processing device according to a sixth embodiment.

FIG. 11 is a flowchart showing the flow of processes in a routine for creating threads in the central ECU 80 according to the sixth embodiment. This routine is executed by the storage coordinator 105 when the vehicle control system 100 is activated.

When starting this routine, the storage coordinator 105 determines whether the voltage Vb of the battery is greater than or equal to the threshold in the process of step S500. Specifically, in the process of step S500, the processor 81 determines whether the voltage Vb of the battery mounted in the vehicle is greater than or equal to the threshold.

The threshold is set to such a level that the voltage Vb is ensured to such an extent that the control of the vehicle does not become unstable even when multiple accesses to the shared storage 83 are simultaneously executed through multiple threads based on the fact that the voltage Vb is greater than or equal to the threshold.

In the process of step S500, when determining that the voltage Vb is greater than or equal to the threshold (step S500: YES), the storage coordinator 105 advances the process to step S510. The storage coordinator 105 creates multiple threads in the process of step S510. Specifically, in the process of step S510, the processor 81 creates the same number of threads as the number of applications that access the shared storage 83, as in the first embodiment. As the process of step S510, as in the second embodiment, the processor 81 may be configured to execute a process of creating the same number of threads as the number of files accessed by the application.

After creating multiple threads, the storage coordinator 105 temporarily suspends this routine.

On the other hand, when determining that the voltage Vb is less than the threshold in the process of step S500 (step S500: NO), the storage coordinator 105 advances the process to step S520. The storage coordinator 105 creates one thread in the process of step S520.

After creating one thread, the storage coordinator 105 temporarily suspends this routine.

Execution of Access by Thread Accessor 107

When multiple threads have been created, the thread accessor 107 executes the routine shown in FIG. 5 as in the first embodiment. That is, the thread accessor 107 uses multiple threads to concurrently process access requests from multiple applications.

On the other hand, when only one thread has been created, the thread accessor 107 sequentially accesses the shared storage 83 in response to the access requests stored in the queue 106 by using the one thread.

Operation

In the sixth embodiment, when the vehicle control system 100 is activated, the processor 81 creates multiple threads on condition that the execution conditions including a condition that the voltage Vb of the battery is greater than or equal to the threshold are met.

Advantages

The sixth embodiment has the following advantage in addition to the above described advantages (1-1) and (5-1).

(6-1) Since multiple threads are created in advance before an access request is made, access to the shared storage 83 is executed quickly as compared with a configuration in which a thread is created after an access request is made as in the fifth embodiment.

The following are modifications commonly applicable to the above-described embodiments. The following modifications can be combined as long as the combined modifications remain technically consistent with each other.

In each of the above-described embodiments, the central ECU 80 is equipped with the storage coordinator 105 as a virtual machine to control access to the shared storage 83. The information processing device that controls access to the shared storage 83 is not limited to a configuration implemented by such a virtual machine.

In each of the above-described embodiments, the configuration in which the central ECU 80 is the information processing device is illustrated. However, the information processing device that controls access to the shared storage 83 may be implemented by an ECU other than the central ECU 80. For example, an ECU that functions as the information processing device may be provided separately from the central ECU 80.

In the above-described embodiments, the central ECU 80, which is the information processing device, includes the processor 81 and the memory 82 and executes software processing. However, this is merely an example. For example, the information processing device may include a dedicated hardware circuit (such as an application specific integrated circuit: ASIC) that executes at least part of the software processing executed in the above-described embodiments. That is, the information processing device may be modified as long as it has any one of the following configurations (A) to (C). (A) The information processing device includes a processor that executes all the processes according to programs and a memory that stores the programs. That is, the information processing device includes a software execution device. (B) The information processing device includes a processor that executes part of the processes according to programs and a memory. The information processing device further includes a dedicated hardware circuit that executes the remaining processes. (C) The information processing device includes a dedicated hardware circuit that executes all the processes. Multiple software execution devices and/or multiple dedicated hardware circuits may be provided. That is, the above processes may be executed by processing circuitry that includes at least one of a set of one or more software processing devices and a set of one or more dedicated hardware circuits. The memory, which stores programs, or a computer-readable medium, includes any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An information processing device configured to be employed in a vehicle control system, the vehicle control system including multiple electronic control units connected to each other via a network and a shared storage accessed by multiple applications executed by the respective electronic control units, the information processing device being configured to control access to the shared storage, the information processing device comprising:

a memory; and a processor, wherein the processor is configured to create multiple threads, store, in the memory, access requests for access to the shared storage by the applications and add the access requests for access to a queue such that the access requests are lined up before proceeding with processes in the applications;

execute the access requests lined up in the queue using free ones of the threads in the order in which the access requests were added to the queue; and create the threads when execution conditions are met, the execution conditions including a condition that a voltage of a power supply is greater than or equal to a threshold.

2. The information processing device according to claim 1, wherein the processor is configured to create a number of the threads equal to a number of files accessed by the applications.

3. The information processing device according to claim 1, wherein the processor is configured to create a number of the threads equal to a number of the applications that access the shared storage.

4. The information processing device according to claim 1, wherein the processor is configured to create the threads upon activation of the vehicle control system.

5. The information processing device according to claim 1, wherein the processor is configured to create a thread each time the access request to the shared storage by any of the applications is made.

6. An information processing device configured to be employed in a vehicle control system, the vehicle control system including multiple electronic control units connected to each other via a network and a shared storage accessed by multiple applications executed by the respective electronic control units, the information processing device being configured to control access to the shared storage, the information processing device comprising:

a memory; and a processor, wherein the processor is configured to create multiple threads, store, in the memory, access requests for access to the shared storage by the applications and add the access requests for access to a queue such that the access requests are lined up before proceeding with processes in the applications;

execute the access requests lined up in the queue using free ones of the threads in the order in which the access requests were added to the queue; and create the threads when execution conditions are met, the execution conditions including a condition that a collision has been detected.

7. An information processing device configured to be employed in a vehicle control system, the vehicle control system including multiple electronic control units connected to each other via a network and a shared storage accessed by multiple applications executed by the respective electronic control units, the information processing device being configured to control access to the shared storage, the information processing device comprising:

a memory; and
a processor, wherein
the processor is configured to
create multiple threads,
store, in the memory, access requests for access to the shared storage by the applications and add the access requests for access to a queue such that the access requests are lined up before proceeding with processes in the applications;
execute the access requests lined up in the queue using free ones of the threads in the order in which the access requests were added to the queue; and
create the threads when execution conditions are met, the execution conditions including a condition that a warning device is operating.

8. An information processing method by which an information processing device configured to be employed in a vehicle control system controls access to a shared storage, the vehicle control system including multiple electronic control units connected to each other via a network and the shared storage accessed by multiple applications executed by the respective electronic control units, the information processing method comprising:
a first step of creating multiple threads by a processor of the information processing device;
a second step of storing, by the processor and in a memory, access requests for access to the shared storage by the applications and adding the access requests for access to a queue such that the access requests are lined up before proceeding with processes in the applications;
a third step of executing, by the processor, the access requests lined up in the queue using free ones of the threads, created through the first step, in the order in which the access requests were added to the queue; and
a fourth step of creating, by the processor, the threads when execution conditions are met, the execution conditions including a condition that a voltage of a power supply is greater than or equal to a threshold.

9. A non-transitory computer-readable storage medium, storing an information processing program that includes instructions to be executed by a processor of an information processing device configured to be employed in a vehicle control system, wherein
the vehicle control system including
multiple electronic control units connected to each other via a network, and
a shared storage accessed by multiple applications executed by the respective electronic control units,
the instructions cause the processor to
create multiple threads,
store, in a memory, access requests for access to the shared storage by the applications and add the access requests for access to a queue such that the access requests are lined up before proceeding with processes in the applications,
execute the access requests lined up in the queue using free ones of the threads in the order in which the access requests were added to the queue, and
create the threads when execution conditions are met, the execution conditions including a condition that a voltage of a power supply is greater than or equal to a threshold.

10. An information processing method by which an information processing device configured to be employed in a vehicle control system controls access to a shared storage, the vehicle control system including multiple electronic control units connected to each other via a network and the shared storage accessed by multiple applications executed by the respective electronic control units, the information processing method comprising:
a first step of creating multiple threads by a processor of the information processing device;
a second step of storing, by the processor and in a memory, access requests for access to the shared storage by the applications and adding the access requests for access to a queue such that the access requests are lined up before proceeding with processes in the applications;
a third step of executing, by the processor, the access requests lined up in the queue using free ones of the threads, created through the first step, in the order in which the access requests were added to the queue; and
a fourth step of creating, by the processor, the threads when execution conditions are met, the execution conditions including a condition that a collision has been detected.

11. A non-transitory computer-readable storage medium, storing an information processing program that includes instructions to be executed by a processor of an information processing device configured to be employed in a vehicle control system, wherein
the vehicle control system including
multiple electronic control units connected to each other via a network, and
a shared storage accessed by multiple applications executed by the respective electronic control units,
the instructions cause the processor to
create multiple threads,
store, in a memory, access requests for access to the shared storage by the applications and add the access requests for access to a queue such that the access requests are lined up before proceeding with processes in the applications,
execute the access requests lined up in the queue using free ones of the threads in the order in which the access requests were added to the queue, and
create the threads when execution conditions are met, the execution conditions including a condition that a collision has been detected.

12. An information processing method by which an information processing device configured to be employed in a vehicle control system controls access to a shared storage, the vehicle control system including multiple electronic control units connected to each other via a network and the shared storage accessed by multiple applications executed by the respective electronic control units, the information processing method comprising:
a first step of creating multiple threads by a processor of the information processing device;
a second step of storing, by the processor and in a memory, access requests for access to the shared storage by the applications and adding the access requests for access to a queue such that the access requests are lined up before proceeding with processes in the applications;
a third step of executing, by the processor, the access requests lined up in the queue using free ones of the threads, created through the first step, in the order in which the access requests were added to the queue; and
a fourth step of creating, by the processor, the threads when execution conditions are met, the execution conditions including a condition that a warning device is operating.

13. A non-transitory computer-readable storage medium, storing an information processing program that includes instructions to be executed by a processor of an information processing device configured to be employed in a vehicle control system, wherein
the vehicle control system including
multiple electronic control units connected to each other via a network, and
a shared storage accessed by multiple applications executed by the respective electronic control units,
the instructions cause the processor to
create multiple threads,
store, in a memory, access requests for access to the shared storage by the applications and add the access requests for access to a queue such that the access requests are lined up before proceeding with processes in the applications,
execute the access requests lined up in the queue using free ones of the threads in the order in which the access requests were added to the queue, and
create the threads when execution conditions are met the execution conditions including a condition that a warning device is operating.

* * * * *